Patented May 1, 1951

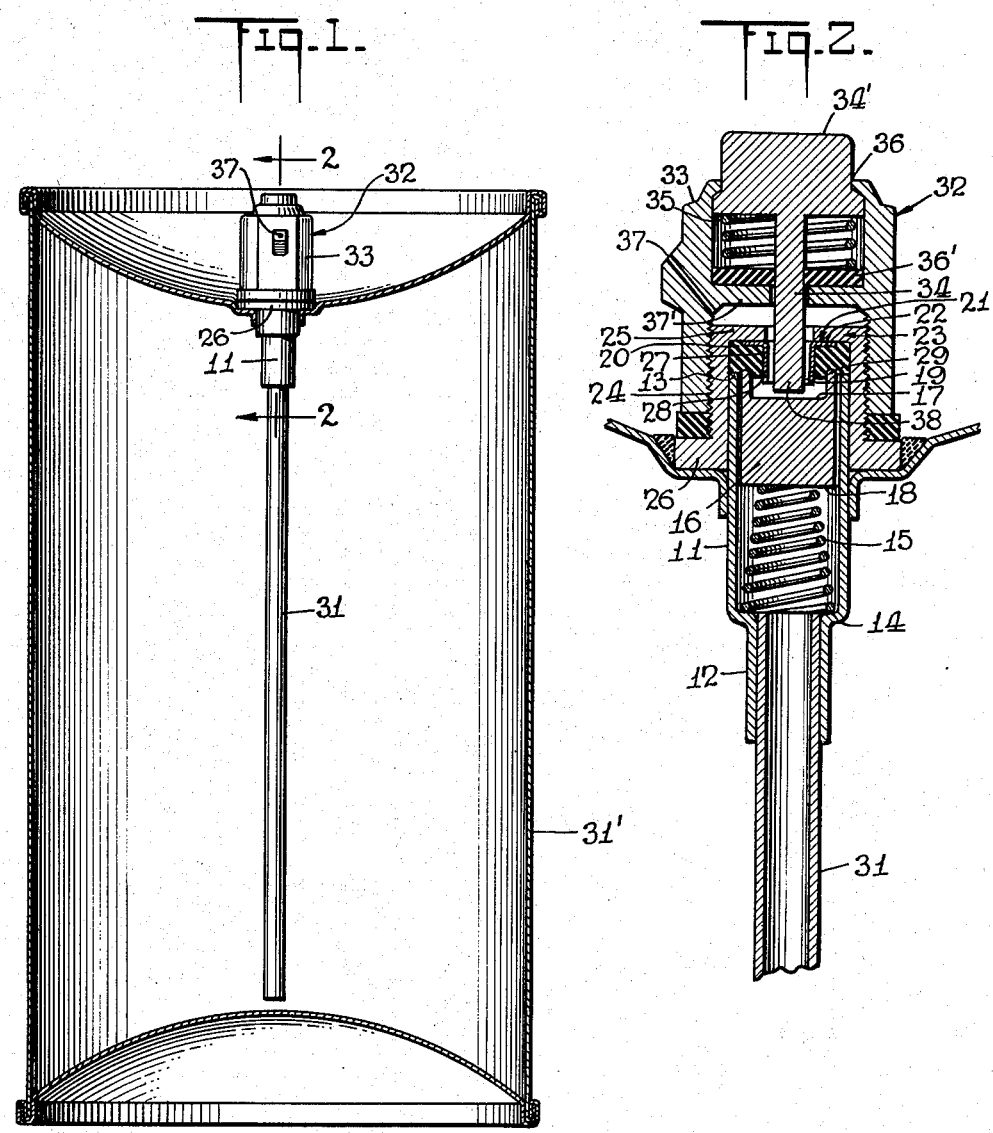

2,550,863

UNITED STATES PATENT OFFICE 2,550,863

VALVE ASSEMBLY

Zbislaw M. Roehr, New York, N. Y., assignor to Roberts Pressure Valve Co., Inc., New York, N. Y., a corporation of New York Application August 13, 1946, Serial No. 690,211

1 Claim. (Cl. 251—137)

This invention relates to valve assemblies and more particularly to a valve assembly controlling the outlet of a container in which liquid or gas is confined under pressure.

It is among the objects of my invention to provide a pressure valve assembly that is neat, compact and efficient in operation and does not readily become out of order, that is simple and inexpensive to construct, that contains few parts and that lends itself easily to quantity production.

According to the invention, these objects are accomplished by the arrangement and combination of elements hereinafter described and particularly recited in the claim.

In the accompanying drawings in which are shown one or more of various possible embodiments of the several features of the invention, Fig. 1 is a longitudinal sectional view of the container with the device in place, and Fig. 2 is a sectional view on a larger scale taken along line 2—2 of Fig. 1.

Referring now to the drawings, the valve assembly comprises a casing 11 preferably cylindrical in shape having a reduced root end 12 forming a junction shoulder 14 on which is seated a spring 15. A valve closure member 16 completely enclosed in said casing with a diameter slightly smaller than the inner diameter of said casing has a cup portion 17 at the upper end thereof and rests on spring 15 as at 18, thereby being urged to seat against a compressible gasket 20 preferably of rubber or other flexible material having an eyelet 21 therein coaxial with said gasket.

The eyelet 21 has a flange 22 resting on the upper surface of said gasket, which latter is clamped to the top 13 of said casing by the inturned rim or flange 25 of valve cap 23 which is affixed to the casing by force fit. The gasket 20 is thereby compressed between flange 25 of the valve cap 23 and the top 13 of the casing and confined between the inner wall of the valve cap and the eyelet. The outer wall 24 of valve cap 23 is threaded and a flange 26 at the lower end of said cap serves for mounting purposes.

As the wall 27 of the eyelet is slightly longer than the thickness of the gasket 20 as at 28, the gasket is not distorted inwardly by being compressed and the mouth 19 of the valve assembly is not blocked.

Inasmuch as the gasket is of compressible material, the rim 29 of the cup portion 17 of the valve closure member 16 will be forced slightly into the gasket by the tension of spring 15, thereby tightly sealing the mouth of the valve assembly, the gasket thereby serving both as a valve seat for valve closure member 16 and a washer between the valve cap and the casing.

The particular embodiment of the valve assembly herein chosen for the illustration of my invention is shown as incorporated in a cylinder 31' capable of containing fluid under pressure to be dispensed in the form of a spray.

The valve assembly has a narrow pipe 31, telescoped into and affixed to its lower part 12, which extends to nearly the bottom of cylinder 31' and is fitted to an opening at the top thereof so that the flange portion 26 of said valve assembly rests on the outside of said top to which it is soldered or otherwise securely affixed.

In order to operate the valve assembly so that the contents of the cylinder may be ejected, a valve assembly actuating device 32 to depress the valve closure member 16 is screwed upon the threaded portion of the valve cap. This device 32 comprises a casing 33 in which is confined a pin 34 having a push button or head 34' at one end thereof which extends beyond the casing as at 36.

A washer 36' surrounds the pin and rests on the inturned flange 37' of the casing 33. A spring 35 situated between the washer 36 and the head 34' of the pin urges the pin outward from the valve assembly closure member 16. The casing 33 has an opening 37 through which the contents of the cylinder may be ejected. Depressing of head 34' of pin 34 will cause its lower end or tip 38 to press against the cup portion 17 of the valve closure member, thereby moving said closure member away from its seat and affording a free passage for ejection under the pressure maintained in the cylinder through pipe 31, around the sides of the valve closure member 16 through the mouth 19 of the valve assembly and out of opening 37 in the casing 33 of the valve assembly actuating device.

When the pressure on head 34' is released, spring 35 will force the tip 38 of the pin away from the valve cup 17 and the tension of spring 15 will again seat the valve closure member 16 and seal the cylinder.

The small size of the valve assembly herein and the simplicity of its construction makes it relatively inexpensive to manufacture and it can be affixed to a container as an integral part thereof and discarded with the empty container.

As many changes could be made in the above construction and many apparently widely different embodiments of this invention could be made without departing from the scope of the claim, it is intended that all matter contained in the above description or shown in the accompanying drawings shall be interpreted as illustrative and not in a limiting sense.

Having thus described my invention what I claim as new and desire to secure by Letters Patent of the United States is:

A pressure valve assembly comprising a cylindrical casing having a reduced root end, a shoulder formed by said reduced root end, a valve closure member completely enclosed in said casing having a cup portion at one end thereof forming a rim at the periphery thereof, a threaded valve cap having an inwardly turned rim at the upper end thereof and a mounting flange at the lower end thereof, a compressible gasket encompassing said valve cap near its lower end and seated on said mounting flange, a valve assembly actuating device to unseat said valve closure member, said device being affixed to said valve cap and seated on said compressible gasket, a compressible gasket having an eyelet therein coaxial therewith, said eyelet having a flange resting on the surface of said gasket and a bore longer than the thickness of said gasket, said gasket being clamped between the rim of said valve cap and the top of said casing and confined between the inner walls of said valve cap and said eyelet, and a spring resting on said shoulder and seating said closure member against said gasket.

ZBISLAW M. ROEHR.

REFERENCES CITED

The following references are of record in the file of this patent:

UNITED STATES PATENTS

| Number | Name | Date |
| --- | --- | --- |
| 710,674 | Fassmann | Oct. 7, 1902 |
| 987,633 | Long | Mar. 21, 1911 |
| 1,162,834 | Watrous | Dec. 7, 1915 |
| 1,503,633 | Long | Aug. 5, 1925 |
| 1,568,159 | Heywood | Jan. 5, 1926 |
| 2,222,926 | Young | Nov. 26, 1940 |
| 2,372,392 | Pletman | Mar. 27, 1945 |